(12) United States Patent
Stickle

(10) Patent No.: US 9,984,079 B1
(45) Date of Patent: May 29, 2018

(54) MANAGING DATA STORAGE USING STORAGE POLICY SPECIFICATIONS

(75) Inventor: Thomas C. Stickle, Saint James, NY (US)

(73) Assignee: Amazon Technologies, Inc., Reno, NV (US)

( * ) Notice: Subject to any disclaimer, the term of this patent is extended or adjusted under 35 U.S.C. 154(b) by 421 days.

(21) Appl. No.: 13/350,658

(22) Filed: Jan. 13, 2012

(51) Int. Cl.
  G06F 17/30 (2006.01)
  G06F 3/06 (2006.01)
  H04L 29/08 (2006.01)
  G06F 11/14 (2006.01)

(52) U.S. Cl.
  CPC ...... G06F 17/30082 (2013.01); G06F 3/0604 (2013.01); G06F 3/067 (2013.01); G06F 3/0685 (2013.01); G06F 11/1451 (2013.01); G06F 11/1456 (2013.01); G06F 17/302 (2013.01); G06F 17/30215 (2013.01); H04L 67/1097 (2013.01); H04L 67/2842 (2013.01)

(58) Field of Classification Search
  CPC .......... G06F 17/30; G06F 3/06; G06F 17/302; G06F 17/30082; G06F 17/30215; G06F 3/067; G06F 3/0604; G06F 3/0685; G06F 11/1451; G06F 11/1456; G06F 11/1461; H04L 67/10; H04L 67/2842; H04L 67/1097
  USPC ........ 707/821, 626, 634, 636, 694, 812, 652
  See application file for complete search history.

(56) References Cited

U.S. PATENT DOCUMENTS 8,407,190 B2 * 3/2013 Prahlad et al. ............... 707/692
2003/0046270 A1 * 3/2003 Leung et al. ..................... 707/1
2005/0033757 A1 * 2/2005 Greenblatt et al. ........... 707/100
2005/0114296 A1 * 5/2005 Farber et al. ..................... 707/1
2005/0114438 A1 * 5/2005 Bendich et al. .............. 709/203
2006/0259949 A1 * 11/2006 Schaefer et al. .................. 726/1
2007/0083575 A1 * 4/2007 Leung et al. .................. 707/205
2008/0082551 A1 * 4/2008 Farber et al. ................... 707/10
2008/0152216 A1 * 6/2008 Meadow et al. .............. 382/154
2009/0276771 A1 * 11/2009 Nickolov et al. ............. 717/177
2010/0241807 A1 * 9/2010 Wu et al. ...................... 711/118

(Continued)

OTHER PUBLICATIONS

"Cache Algorithms," retrieved on Nov. 27, 2011, from http://en.wikipedia.org/wiki/Cache_algorithms, 4 pages.

(Continued)

Primary Examiner — Dennis Truong
(74) Attorney, Agent, or Firm — Seed IP Law Group LLP

(57) ABSTRACT

Techniques are described for managing data storage using defined data storage management policies. In some situations, data storage may be managed using multiple supported storage mechanisms, such as different storage mechanisms of different types and/or in different locations. As one example, the described techniques may be performed to manage data that is available to a software program executing on a computer system, such as by caching a subset of the available data on one or more storage mechanisms to enhance later retrieval times of that data subset by the software program. In this example, the multiple supported storage mechanisms may include one or more storage mechanisms local to the computer system and one or more storage mechanisms remote from the computer system, and a defined data storage management policy for the software program may define particular types of data to store on particular storage mechanisms in particular manners.

18 Claims, 5 Drawing Sheets

(56) References Cited

U.S. PATENT DOCUMENTS

| | | | |
|---|---|---|---|
| 2010/0332401 A1* | 12/2010 | Prahlad et al. | 705/80 |
| 2010/0332530 A1* | 12/2010 | McKelvie et al. | 707/770 |
| 2010/0333116 A1* | 12/2010 | Prahlad et al. | 719/328 |
| 2011/0184913 A1* | 7/2011 | Hayden | G06F 11/2097 707/652 |
| 2011/0196834 A1* | 8/2011 | Kesselman | 707/634 |
| 2011/0225177 A1* | 9/2011 | Farber et al. | 707/758 |
| 2011/0246491 A1* | 10/2011 | Clash et al. | 707/755 |
| 2011/0276664 A1* | 11/2011 | Prahlad et al. | 709/219 |
| 2012/0076358 A1* | 3/2012 | Meadow et al. | 382/103 |
| 2012/0110019 A1* | 5/2012 | Nielsen et al. | 707/781 |
| 2012/0144448 A1* | 6/2012 | Gunawardena et al. | 726/1 |
| 2012/0291006 A1* | 11/2012 | Quine | 717/105 |
| 2012/0323992 A1* | 12/2012 | Brobst et al. | 709/203 |
| 2013/0097170 A1* | 4/2013 | Flanagan | 707/737 |
| 2013/0124401 A1* | 5/2013 | Del Real | 705/39 |
| 2013/0143513 A1* | 6/2013 | Ginter et al. | 455/404.1 |
| 2013/0144736 A1* | 6/2013 | Vodopia | 705/20 |
| 2013/0185530 A1* | 7/2013 | Puttaswamy Naga et al. | 711/162 |

OTHER PUBLICATIONS

"2 Understanding TopLink Application Development," retrieved on Nov. 27, 2011, from http://docs.oracle.com/cd/B32110_01/web.1013/b28218/undtldev.htm, 37 pages.

Gonzales, A., et al., "A Data Cache with Multiple Caching Strategies Tuned to Different Types of Locality (1995)," retrieved on Nov. 27, 2011, from http://citeseer.ist.psu.edu/viewdoc/summary?doi=10.1.1.55.4061, 10 pages.

Reddy, A. L. Narasimha, "Evaluation of Caching Strategies for an Internet Server," retrieved on Nov. 27, 2011, from www.ece.tamu.edu/~reddy/papers/ieeemm97.ps, 8 pages.

Zhou, Yuanyuan., et al., "The Multi-Queue Replacement Algorithm for Second Level Buffer Caches," retrieved on Nov. 27, 2011, from http://www.usenix.org/events/usenix01/full_papers/zhou/, 15 pages.

* cited by examiner

MANAGING DATA STORAGE USING STORAGE POLICY SPECIFICATIONS

BACKGROUND

As the amount of information that is collected and used by software programs has grown, the use of various types of data storage systems has correspondingly increased. Despite the availability of increasing amounts of storage capacity on individual computer systems, it is nonetheless desirable at times to store at least some data for use by a computer system on one or more other systems. However, existing systems for managing data storage have various problems.

DETAILED DESCRIPTION

Figure 1:
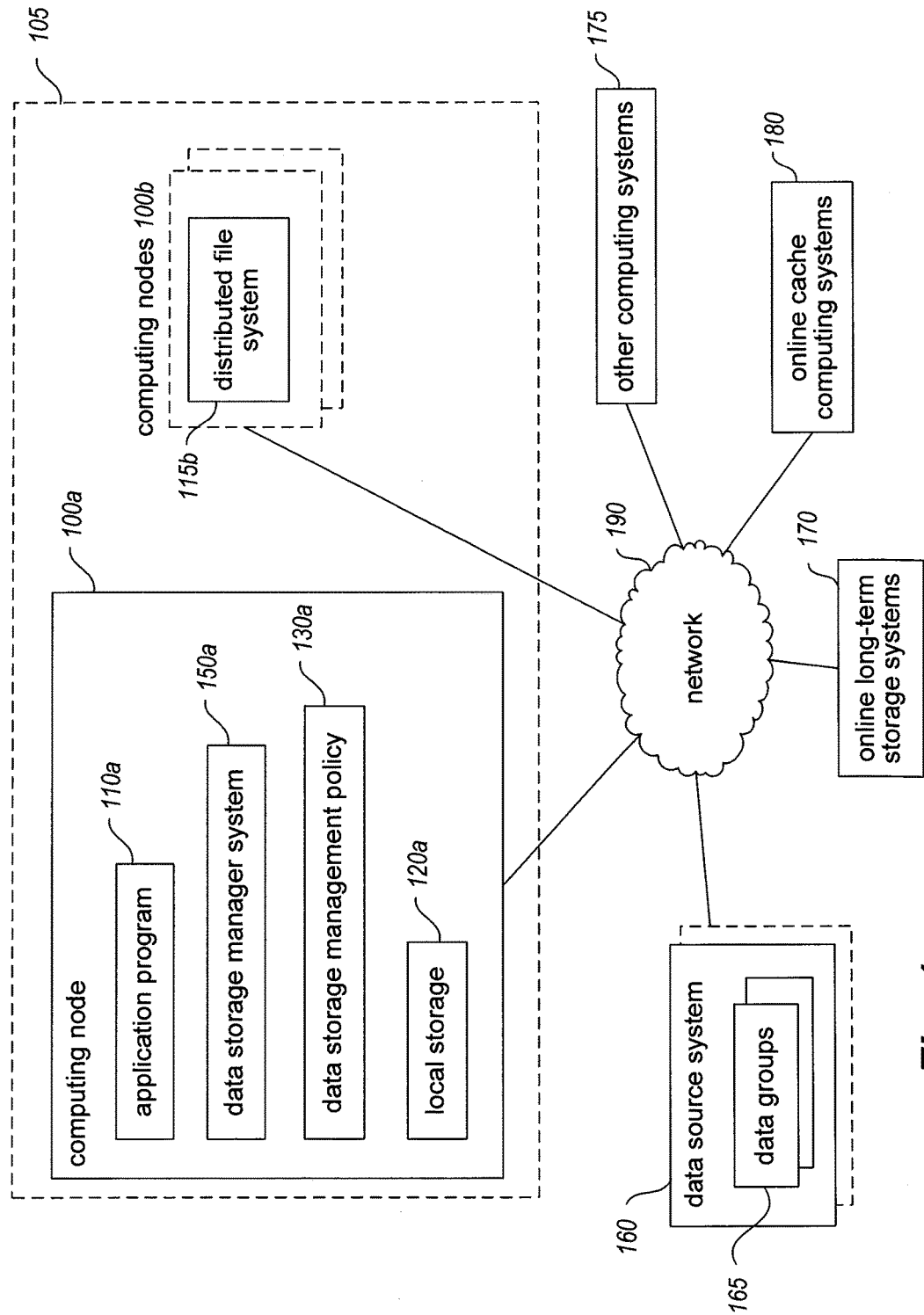
FIG. 1 illustrates an example embodiment of a data storage manager system that manages data storage on supported storage mechanisms using a defined data storage management policy.

Techniques are described for managing data storage using defined data storage management policies. In at least some embodiments, the storage of available data is managed using multiple supported storage mechanisms, such as different storage mechanisms of different types and/or in different locations. As one illustrative example, the described techniques may be performed to manage various data that is available to a software program executing on a computer system, such as by using one or more storage mechanisms to cache a subset of the available data to enhance later retrieval times of that subset of data by the software program. In this illustrative example, the multiple supported storage mechanisms may include one or more storage mechanisms local to the computer system and one or more storage mechanisms remote from the computer system, and a defined data storage management policy for the software program may define particular types of data to store on particular storage mechanisms in particular manners. Additional details are included below related to the described techniques, and at least some of the described techniques are performed by automated operations of a data storage manager system in some embodiments.

As noted above, one or more storage mechanisms of one or more types may be used to store at least some data for later access by one or more target computer systems, such as to support one or more software programs executing on the one or more target computer systems. Such storage mechanisms may differ in type and/or in geographical location in some situations, such as to provide different types of data storage characteristics and/or data retrieval characteristics with respect to the target computer system(s)—such data storage and/or retrieval characteristics may, for example, include one or more of the following non-exclusive list: communication latency (e.g., with respect to one or more data buses, networks or other communication links via which the data may travel from a storage mechanism to volatile memory of a target computer system), communication throughput, communication bandwidth, communication error rate, storage mechanism load, storage mechanism availability/uptime, etc. When multiple storage mechanisms are used of multiple types or that otherwise have different data storage and/or retrieval characteristics, different types of data may be stored in specified manners on different specified storage mechanisms to provide various types of benefits, as discussed in greater detail below.

With respect to storage mechanism types that are local to a target computer system, a first example of a local storage mechanism type for a target computer system includes at least a portion of a local non-volatile storage device for the target computer system (e.g., a storage device that is attached to or otherwise part of the target computer system), such as a portion of the local storage device that may optionally be dedicated for use as a storage cache for a particular software program executing on the target computer system and/or for a particular user of one or more software programs executing on the target computer system. As a second example of a storage mechanism type that may be local to a target computer, at least a portion of a distributed file system may be used as a storage mechanism, such as for a distributed file system that is provided in part by the target computer system (e.g., using one or more local storage devices of the target computer system) and in part by one or more other associated computer systems—when the described techniques are used to manage data for a software program executing on the target computer system, the other associated computer systems may in some embodiments be other computer systems that also are executing that software program, whether in a distributed manner with the target computer system or by each independently executing a copy of the software program. Non-exclusive examples of distributed file systems that may be used include the following: GlusterFS, AFS (Andrew File System), NFS (Network File System), Dfs (Distributed File System), GFS (Google File System), HDFS (Hadoop Distributed File System), etc. In some embodiments, other types of storage mechanism types local to a target computer system may be used, including a virtual local block storage device whose data is stored at least in part on one or more remote systems, whether instead of or in addition to local storage mechanisms of the types discussed in the first and/or second examples. In addition, such a local storage device for a target computer system may, for example, be permanently attached to a target computer system (e.g., a hard disk internal to the target computer system) and/or temporarily attached to the target computer system (e.g., a USB-based flash key or drive, a portable external hard disk, a magnetic tape that may be used in a tape drive of the target computer system, etc.).

With respect to storage mechanism types that are remote from a target computer system, one example of a remote storage mechanism type for a target computer system includes a remote online storage service provided by one or more systems that are separated from the target computer system by one or more intervening networks. Such online storage services may be of different types and provide different types of capabilities, such as a first online storage service that provides long-term storage for object data, a second online storage service that provides in-memory cache data in a distributed manner over multiple systems, a third online storage service that provides long-term storage for database data, a fourth online storage service that provides long-term block data storage, etc. Non-exclusive examples of online storage services that may be used include the following: Amazon Simple Storage Service (S3) that stores object data of various types; Amazon ElastiCache that provides an in-memory cloud-based cache; an online storage service using the memcached distributed memory caching system; Amazon Elastic Block Store (EBS) that provides access to raw block storage devices, including to enable mounting a virtual local block storage device on a target computer system; Amazon SimpleDB that provides functionality to store key-value pairs; Amazon Relational Database Service (RDS) that provides relational database functionality; etc. In some embodiments, other types of storage mechanism types that are remote from a target computer system may be used, whether instead of or in addition to remote storage mechanisms of the types discussed above, including a remote database, a remote storage area network, one or more remote network storage devices, a remote storage system (e.g., a RAID-based system), etc.

As noted above, defined data storage management policies may be used in some embodiments to control or otherwise influence how, when and whether particular data is stored in zero or more supported storage mechanisms. For example, a particular defined policy may specify one or more particular storage mechanisms, and provide information related to one or more data groups to each be stored on one or more specified storage mechanisms. In addition, some defined data storage management policies may include storage-related criteria that affect storage of particular data groups, as discussed further below. In addition, in some embodiments and situations, some or all specified storage mechanisms may be ranked or ordered, such as with respect to one or more data storage and/or retrieval characteristics of interest (e.g., latency). As noted above, a particular defined policy may in some embodiments be associated with a particular software program or a particular copy of a software program, to facilitate access to data during execution of that software program—in other embodiments, a particular defined policy may be associated with other information (e.g., one or more particular users), whether instead of or in addition to a software program. Such defined policies may further include additional information in some embodiments and situations, such as access information for a particular indicated storage mechanism, including one or more of the following non-exclusive types of information: a network location or other information used to identify a particular remote storage mechanism; login information or other access control information (e.g., a credential) for a particular storage mechanism, such as information associated with an account of an online storage system that is associated with a provider of a software program and/or a user of a software program; etc. A defined policy may further be specified in various manners in various embodiments, such as by using a specified declarative language, a data markup or scripting language (e.g., XML, or "eXtensible Markup Language"; JSON, or "JavaScript Object Notation"; etc.), etc. Particular data groups may also be identified in a defined policy in various manners in various embodiments and situations, with non-exclusive examples of specifying data groups including identifying a particular data group (e.g., by name, location of the data group on an external data source, etc.), and including specifying a type of data group (e.g., based on a particular type of data, such as video data, image data, etc.; particular associated metadata, such as particular metadata tags or particular associated metadata values; particular subject matter of the data, such as to correspond to a specified location or object; particular external data source; etc.), such that data groups of that type are identified.

Some defined data storage management policies may include storage-related criteria with respect to particular data groups and/or storage mechanisms—such criteria may, for example, include one or more of the following: timing-related information (e.g., to initiate preloading of a specified data group in a specified storage mechanism before use of that data group begins; to specify criteria for maintaining stored data in one or more specified storage mechanisms after it has been used, such as a time-to-live or other time-based expiration; etc.); priority information (e.g., for use in determining whether to store a specified data group in a specified storage mechanism instead of other data, such as to store data having a highest associated priority until the storage mechanism is full); size-related information (e.g., to specify the size of total storage to be used on a particular specified storage mechanism; to specify the amount of a particular data group or type of data to store in one or more storage mechanisms; etc.); etc. It will be appreciated that various other types of storage criteria may be used in at least some embodiments, whether instead of or in addition to other types of storage criteria specified above, including based on factors such as recency of data use, frequency of data use, cost (e.g., in time, money, or other metric) to replace from an external data source; etc. In some situations, some data groups may not be stored in any storage mechanisms and instead may be retrieved from external data sources when used, other data groups may be stored in a single specified storage mechanism during at least some times, other data groups may be stored in one or more specified storage mechanisms at all times or substantially all times (e.g., in a single storage mechanism; in different storage mechanisms at different times, such as based on an ordering of the different storage mechanisms; etc.), and/or other data groups may be stored in multiple specified storage mechanisms during at least some times (e.g., to store some or all of a first type of data in a first specified storage mechanism, and to also store a subset of that first type of data in a second specified storage mechanism, such as for one or more data groups that have recently been used and/or that are expected to be used in the near future).

As one illustrative example, consider an application program that uses geo-location data, such as to present imagery data for any part of the Earth to one or more users of the application program on request. The geo-location dataset for such an application program may be sufficiently large to prevent all of the data from being stored locally to a target computer system that is executing the application program. In addition, different data groups within the overall dataset may have sufficiently different access patterns. For example, data corresponding to the locations of cities may be accessed much more frequently than data corresponding to less-populated areas (e.g., countryside, forests, oceans, etc.). In addition, users in a particular geographical area (e.g., a particular country, state, city or region) may access data corresponding to that geographical area more often than data corresponding to other geographical areas. Given such a situation, a creator, distributor or other provider of the application program may specify one or more defined data storage management policies for use with the application program. As a particular example, a defined data storage management policy may specify that a first set of one or more data groups be preloaded before use on a storage mechanism local to the target computer system, such as within a distributed file system of which the target computer system is a part, and to occur upon start of the application program or a first data request from the application program. The first set of data groups may correspond, for example, to one or more cities in a geographic area in which the target computer system is located or in which a particular user of the application program is located (if the user is interacting with the application program from a remote location), and may be identified based on specifying particular geographic coordinates (e.g., latitudes and longitudes) for those one or more cities. As another particular example, the defined data storage management policy may instead or additionally specify that a 100 GB portion of one or more local storage devices of the target computer system is to be used to store data that has recently been requested and used by the application program, such as with one or more data replacement or removal storage criteria being specified to control how that storage occurs. It will be appreciated that a wide variety of other types of data and defined policies may be used.

To implement the defined data storage management policy of the prior example, a data storage manager system may be executed that receives the defined policy and that has access to data requests performed by the application program. Thus, the data storage manager system may operate to, for example, perform one or more of the following automated operations: preload any data groups specified by the defined policy in any specified storage mechanisms; receive data requests from the application program and satisfy them in a preferred manner (e.g., to retrieve the requested data from one or more specified storage mechanisms if possible, optionally in an ordered manner for the specified storage mechanisms if the data is available on multiple storage mechanisms, and to otherwise forward the data requests to external data sources from which the data is available); to receive data that is used by the application program (e.g., for external data sources, such as in response to forwarded data requests; from the application program, such as after the application program otherwise obtains the data; etc.) and to optionally store it in one or more specified storage mechanisms for later use, such as in accordance with any storage criteria specified for the defined policy; etc. The data storage manager system may be implemented in various manners in various embodiments, including in the following non-exclusive manners: as a part of the application program, such as a library or other component that is loaded by or otherwise included by the application program; as a separate program executing on the target computer system that is able to intercept data requests by the application program, optionally in a manner transparent to the application program such that the operation of the data storage manager system may not be known (e.g., if the application program is executing as part of one of multiple computing nodes provided by the target computer system, such as a virtual machine computing node, the data storage manager system may execute as part of a hypervisor or other virtual machine monitor for the target computer system); as a separate program executing remotely from the target computer system that is able to intercept data requests by the application program, optionally in a manner transparent to the application program such that the operation of the data storage manager system may not be known (e.g., if the data storage manager system is executing on a proxy device or other computing system via which data requests from the application program will travel); as a separate program (whether executing on the target computer system or remotely from it) that the application program is designed or configured to contact with data requests, such as by identifying the data storage manager system to the application program as the external data source for the geo-location dataset; etc.

Additional details related to managing the storage and retrieval of data in accordance with defined data storage management policies are included below, including with respect to FIG. 2.

For illustrative purposes, some embodiments are described below in which specific instances of data storage management are provided in specific ways, including with respect to specific storage mechanisms, specific types of data, and specific data storage management policies. These examples are provided for illustrative purposes and are simplified for the sake of brevity, and the inventive techniques can be used in a wide variety of other situations, some of which are discussed below, and the techniques are not limited to use with particular types of data, storage or other devices, computing systems or computing system arrangements.

FIG. 1 is a network diagram that illustrates an example embodiment of a data storage manager system that manages data storage on supported storage mechanisms using a defined data storage management policy. In particular, in the illustrated embodiment, a target computing node 100a is illustrated, which is executing an example embodiment of a data storage manager system 150a. The target computing node 100a is further executing a software application program 110a in this example, which may use various data groups 165 when executing. In this example, the various data groups 165 are available from one or more data source systems 160 over one or more networks 190, such as one or more storage systems that are remote from the target computing node 100a.

In order to manage access of the application program 110a to the various data groups 165, the data storage manager system 150a executes on the target computing node 100a and performs corresponding automated operations to provide some or all of the described techniques. In particular, in the illustrated example a data storage management policy 130a is provided to the data storage manager system 150a, such as by an operator of the application program 110a or target computing node 100a. The data storage manager system 150a then operates to store particular subsets of the data groups 165 on various supported storage mechanisms at various times in accordance with the data storage management policy 130a. In other embodiments, the data storage manager system 150a may execute partially or wholly separate from the target computing node 100a, and/or the data storage manager system 150a may manage storage of data for purposes other than to support the application program 110a.

In this example, the target computing node 100a has access to multiple specified storage mechanisms. The storage mechanisms in this example may include use of the following: one or more local storage devices 120a of the target computing node 100a; a distributed file system 115b that is provided by one or more computing nodes 100b (and optionally with a portion, not shown, of the distributed file system on the local storage 120a of the target computing node 100a); an online in-memory cache storage service provided using one or more computing systems 180 over the network(s) 190; and an online long-term storage service provided using one or more storage systems 170 over the network(s) 190.

Thus, upon initial startup of the application program 110a (or other specified event), the data storage manager system 150a accesses the defined policy 130a, and may optionally initiate the preloading of one or more data groups 165 on one or more of the specified storage mechanisms in accordance with the defined policy 130a, such as by retrieving those data groups from the data source systems 160 external to the target computing node 100a and initiating the storage of the retrieved data groups on the specified storage mechanism(s). In addition, as data groups 165 are retrieved from the data source systems 160 and used by the application program 110a, the data storage manager system 150a may similarly in some situations store particular data groups from the retrieved data groups on particular specified storage mechanisms in accordance with the defined policy 130a. When the application program 110a requests data groups that are already stored in one or more of the specified storage mechanisms, the data storage manager system 150a may further facilitate access of those stored data groups for the application program 110a, such as by retrieving and providing those requested stored data groups to the application program 110a, indicating the location of the requested stored data groups to the application program 110a so that the application program 110a can retrieve those data groups, etc. In other embodiments, the data storage manager system 150a may perform only some of the described techniques, such as to initiate the preloading and/or storage of requested data groups on specified storage mechanisms, but to have the application program track the location of stored data groups and directly access those stored data groups as desired.

The use of particular data groups by the application program 110a may be initiated in various manners in various embodiments and situations. For example, in some cases the application program 110a may have one or more users, and may request data groups in response to user interactions with the application program 110a, including in situations in which the application program provides a publicly accessible service to such users. Such users may, for example, be local to the target computing node 100a (e.g., to interact with I/O devices, not shown, of the target computing node 100a), and/or may be remote from the target computing nodes 100a (e.g., may use other computing systems 175 to interact with the application program 110a over the network(s) 190). In addition, the data groups that are accessed, stored and used may have various forms in various embodiments and situations, including particular files, Web pages, data objects, database rows or other records, etc.

In the illustrated example, the target computing node 100a and other computing nodes 100b may optionally be operating together as a distributed group 105 of computing nodes, such as to provide functionality of the application program 110a in a distributed manner, to operate the distributed file 115b together, to provide functionality of the data storage manager system 150a in a distributed manner, etc. Thus, while not illustrated in this example, one or more of the other computing nodes 100b may similarly provide functionality corresponding to the application program 110a and/or the data storage manager system 150a, such as by locally executing copies of at least a portion of the application program 110a and/or the data storage manager system 150a. In addition, the target computing node 100a and other computing nodes 100b may have various forms in various embodiments, including to each have various hardware devices that are not shown in the example of FIG. 1—additional details related to such computing nodes are discussed with respect to FIGS. 2 and 3. Each computing node may, for example, be a distinct configured computer system or other distinct hardware device, or instead may each be a virtual machine that is hosted by a particular hardware computing system (e.g., target computing node 100a and other computing nodes 100b may be distinct virtual machine computing nodes that are hosted by a single physical computing system, not shown).

The network(s) 190 of FIG. 1 may include any appropriate network or combination of networks, including an intranet, the Internet, one or more private networks with access to and/or from the Internet, a cellular network, a local area network, or any other such network or combination thereof. Communication over the networks may be enabled by wired or wireless connections and combinations thereof. In the illustrated embodiment, the application program 110a and/or data storage manager system 150a may each include software instructions that execute on the computing node to program or otherwise configure the computing node to perform some or all of the described techniques, such as to program one or more hardware CPU processors (not shown) of the computing nodes. In addition, the various computing nodes 100a and 100b may be provided in various manners, such as at a single data center or otherwise to use a group of co-located computer systems, or instead in a distributed manner using various computer systems in various distinct geographical locations.

Although the foregoing example embodiment of FIG. 1 is described with respect to a data storage manager system that provides various types of functionality for an associated application program in conjunction with one or more users, it will be appreciated that various other embodiments may exist. For example, in at least some embodiments and situations, a user may represent an organization or other group (e.g., a company) with multiple people instead of an individual person. In certain embodiments, one or both of the data storage manager system and various of the specified storage mechanisms may operate according to one or more fee-based structures or agreements. For example, access to some or all of the described techniques may in some embodiments be provided in a fee-based or other paid manner to a provider or operator of the application program 110a and/or to at least some users of the application program 110a. As one example, clients of the data storage manager system may pay one-time fees, periodic (e.g., monthly) fees and/or one or more types of usage-based fees to use functionality provided by the data storage manager system. Fees may be based on one or more factors and activities, such as indicated in the following non-exclusive list: based on the quantity of data to be stored, such as to initially store the data (e.g., as a one-time fee), to maintain ongoing storage and/or retrieval access to the data (e.g., a monthly fee), etc.; based on usage of the data, such as a number of data transfers in a particular period of time; based on content or other characteristics of the particular data groups to be stored and/or retrieved (e.g., media content versus textual content); based on a manner in which the data is transferred (e.g., network bandwidth resources consumed by the initial or subsequent transfers of the data, number of computing systems to or from which the data is transferred, etc.); etc.

Figure 2:
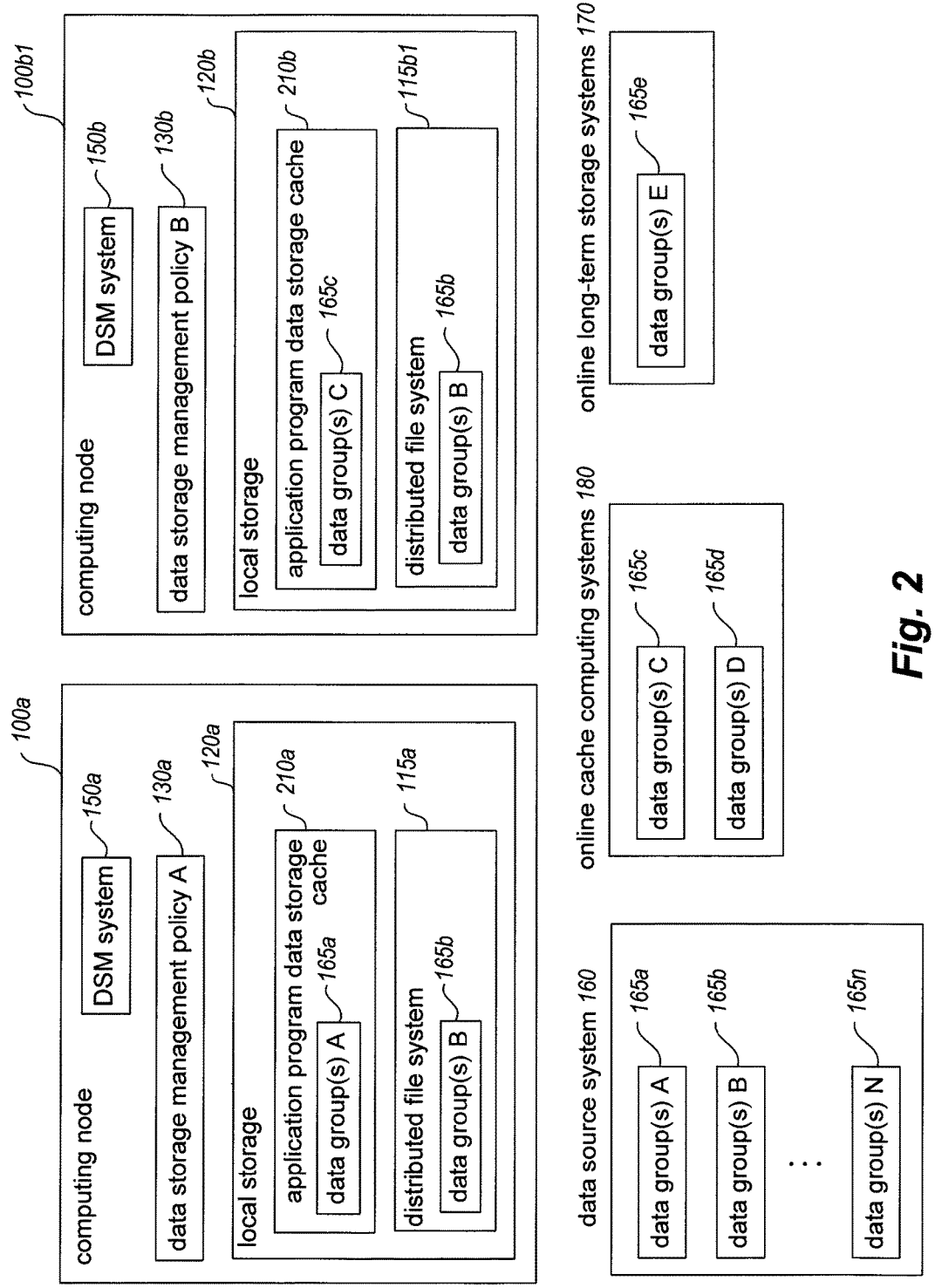
FIG. 2 illustrates an example of managing the storage and/or retrieval of one or more data groups in particular manners on particular supported storage mechanisms.

FIG. 2 illustrates an example of managing the storage and/or retrieval of one or more data groups in particular manners on particular supported storage mechanisms. In particular, FIG. 2 illustrates some of the systems discussed with respect to FIG. 1, and provides additional details related to a particular example of use of those systems.

In the example of FIG. 2, the target computing node 100a is illustrated, along with a particular one of the other computing nodes 100b, referred to in the example of FIG. 2 as computing node 100b1. The target computing node 100a continues to execute copies of the data storage manager system 150a (referred to as the "DSM system" in FIG. 2) and the application program 110a, although the application program 110a is not illustrated in the example of FIG. 2, and the target computing node 100a continues to use a defined data storage management policy 130a (referred to as "storage management policy A" in the example of FIG. 2). In addition, further details are shown in FIG. 2 regarding the local storage 120a of target computing node 100a, including that a portion of the local storage 120a is being used as a data storage cache 210a for the application program 110a, and that another portion of the local storage 120a is a portion 115a of the distributed file system 115b of FIG. 1. Additional details are also provided in the example of FIG. 2 regarding the data source system(s) 160. In particular, with respect to the data source system(s) 160, the data groups 165 of FIG. 1 are illustrated as being separated into N distinct groupings that each includes one or more data groups. For example, each grouping may correspond to a particular data group of interest, to a particular type of data group, etc.

The data storage manager system 150a of the target computing node 100a has initiated the storage of particular data groups on particular specified storage mechanisms in the example of FIG. 2, in accordance with the defined data storage management policy A 130a. In particular, in this example, the data storage manager system 150a has stored a grouping 165a of one or more data groups A on the local data storage cache 210a, has stored a grouping 165b of one or more other data groups B on the distributed file system provided by the computing nodes 100a and 100b1 (e.g., by storing a first portion of the data groups B on the portion 115a of the distributed file system on target computing node 100a, and by storing a distinct but potentially overlapping second portion of the data groups B on the portion 115b1 of the distributed file system on target computing node 100b1), has stored data groups of groupings 165c and 165d on the online cache computing systems 180, and has stored a grouping 165e of one or more data groups on the online long-term storage systems 170. The storage of the various illustrated data groups may occur at distinct times and/or be initiated in distinct manners (e.g., to preload some data before use, to store some data after use to facilitate additional later use, etc.), as discussed in greater detail elsewhere.

The particular data groups to be stored on particular storage mechanisms may be specified in various manners and for various reasons. For example, the specified storage mechanisms may be ordered in various manners, such as if the data storage cache 210a is ordered first with respect to a first metric of interest (e.g., data latency), if the distributed file system and/or online cache computing systems 180 are ordered second with respect to the first metric of interest (optionally with one ordered second and the other ordered third), and if the online long-term storage systems 170 are ordered last with respect to the specified storage mechanisms for the first metric of interest. All of the specified storage mechanisms may be preferred over the external data source systems 160, however, with respect to at least some data groups and situations. If addition to having different characteristics with respect to such a first metric of interest, the specified storage mechanisms may further differ in other manners that affect their use, such as the size of storage that they provide and/or a cost of use. For example, the data storage cache 210a may have a relatively small size, and thus be used to store data groups of a highest priority with respect to a second metric of interest, such as those data groups that are most likely to be used next. The distributed file system and/or online cache computing systems 180 may have larger storage sizes than the data storage cache 210a but slower data access times, and thus be used to store data groups with priorities lower than those stored on the data storage cache 210a. Similarly, the online long-term storage systems 170 may have slower data access times than other specified storage mechanisms, and possibly have larger available storage space than other specified storage mechanisms, and thus be used to store data groups with priorities lower than those stored on the other specified storage mechanisms. In this example, the data groups for a number of other data groupings 165f-165n are not currently stored on any specified storage mechanisms, and thus will instead be retrieved from the external data source systems 160 if requested.

As previously noted, the defined data storage management policy A may specify particular types of data groups to store on particular specified storage mechanisms in various manners in various embodiments. As illustrative examples, consider the following examples of specified information for a defined data storage management policy. For example, the application program 110a may use data corresponding to various molecular models, and the defined data storage management policy A may specify to preload a set of commonly requested protein models on the online cache computing systems 180. A possible example defined data storage management policy corresponding to this example may be as follows, specified using an example JSON format.

```
{
    "fileset": {
        "title": "PENICILLIN-BINDING PROTEIN 2B",
        "files": {
            "resourceType": "filenameRegex",
            "criteria": {
                "search": {
                    "term": {
                        "value": "m/^pBp2"
                    }
                }
            }
        }
    }
    "storagePolicy" : {
      "prefetchStorage" : "true",
      "ttl": "259200",
      "readOnly" : "true",
      "storageSource": {
         "resourceType": "<data source system 160>",
         "resourceURL" : "https://<data source system 160>.com/AppProgram110a/dmodels"
      }
      "storageDestination": {
         "resourceType": <online cache 180>,
         "resourceURL" : "10.9.8.7/11211"
      }
    }
}
```

Thus, in this example defined data storage management policy, the source and destination storage locations of the data groups are specified, with a preload (or "prefetch") criteria set to true, with the stored data groups on the destination location being read-only, and being stored with a TTL ("time-to-live") value of 259200 seconds (or 3 days). The particular data groups are identified in this example to be files whose filenames match a specified regular expression search term of "m/^pBp2", with the search term corresponding to files that contain "pBp2" corresponding to penicillin binding protein 2B. In other embodiments, other types of search terms may be specified and used in other manners, including search terms that do not use regular expressions, search terms that are based on a specified type of metadata other than a filename, search terms that are based on contents of data groups, etc. Similarly, particular data groups may be identified in other embodiments without using any search terms, such as by providing a list of one or more unique identifiers associated with particular corresponding data groups. As another illustrative example, the application program 110a may use geo-spatial data that includes map tiles representing the entire globe at differing scales, and the defined data storage management policy A may specify to maintain one or more data groups corresponding to a particular city on the data storage cache 210a. A possible example defined data storage management policy corresponding to this example may be as follows.

```
{
    "fileset": {
        "title": "Austin, TX",
        "files": {
            "resourceType": "GeoDB",
            "criteria": {
                "search": {
                    "term": {
                        "field": "west_bounding_coordinate",
                        "condition": ">=",
                        "value": "-98.625021"
                    }
                    "term": {
                        "field": "east_bounding_coordinate",
                        "condition": ."<=",
                        "value": "-98.499979"
                    }
                    "term": {
                        "field": "north_bounding_coordinate",
                        "condition": "<=",
                        "value": "29.500021"
                    }
                    "term": {
                        "field": "south_bounding_coordinate",
                        "condition": ">=",
                        "value": "29.374979"
                    }
                }
            }
        }
        "storagePolicy" : {
            "prefetchStorage" : "false",
            "ttl": "28800",
            "readOnly" : "true",
            "storageSource": {
                "resourceType": "<data source system 160>",
                "resourceURL" : "https://<data source system 160>.com/AppProgram110a/maptiles"
            }
            "storageDestination": {
                "resourceType": <data storage cache 210a>,
                "resourceURL" : "//<DSM system>/<data storage cache - app program 110a>/"
            }
        }
    }
}
```

Thus, in this example defined data storage management policy, the source and destination storage locations of the data groups are again specified, with a preload criteria set to false (such that the matching data groups are stored after use but not preloaded), with the stored data groups on the destination location being read-only, and being stored with a TTL ("time-to-live") value of 28,800 seconds (or 8 hours). The particular data groups are identified to be map tiles that are stored in an example "GeoDB" database at the source storage location and that have associated metadata indicating that the content of the map tiles corresponds to specified geographic coordinates in this example. It will be appreciated that these examples are provided for illustrative purposes only, and are not intended to limit the invention described herein.

In addition, the example of FIG. 2 further corresponds to a situation in which the functionality of the application program 110a is provided in a distributed manner using multiple computing nodes, such as with computing node 100b1 executing a distinct copy (not shown) of the application program 110a and handling some related user requests. In this example, the computing node 100b1 further executes a distinct copy of the data storage manager system 150b to provide functionality for the computing node 100b1, although in other embodiments other arrangements may be used (e.g., to provide functionality of the data storage manager system in a distributed manner using both computing node 100a and computing node 100b1). In addition, in this example the computing node 100b1 uses a distinct defined data storage management policy 130b for its executing copy of the application program, such as if the different computing nodes handle different types of user requests (e.g., for an application program using geo-location data, requests from users in different geographical locations). Accordingly, in this example, the data storage manager system 150b uses the information in the defined data storage management policy B 130b to further store a grouping 165c of one or more data groups C on a local data storage cache 210b on local storage 120b of computing node 100b1, and has optionally stored one or more other data groups (not shown) on one or more of the supported available storage mechanisms. With respect to the storing of the grouping 165b of one or more data groups B on the distributed file system provided by the computing nodes 100a and 100b1, the storage may be controlled in various ways, such as solely by the data storage manager system 150a in accordance with defined data storage management policy A 130a, by both data storage manager systems, etc. In other embodiments, only a single data storage manager system may be used to support multiple such computing nodes that are operating together in a distributed manner to provide functionality of a particular application program and/or only a single data storage management policy may be used for different copies of a particular application program. In yet other embodiments, one or more copies of the data storage manager system may simultaneously use multiple defined data storage management policies, such as to support one or more application programs, and optionally by using different portions of one or more specified storage mechanisms.

It will be appreciated that the examples of FIG. 2 are provided for illustrative purposes, and that the invention is not limited by the details discussed with respect to those examples.

Figure 3:
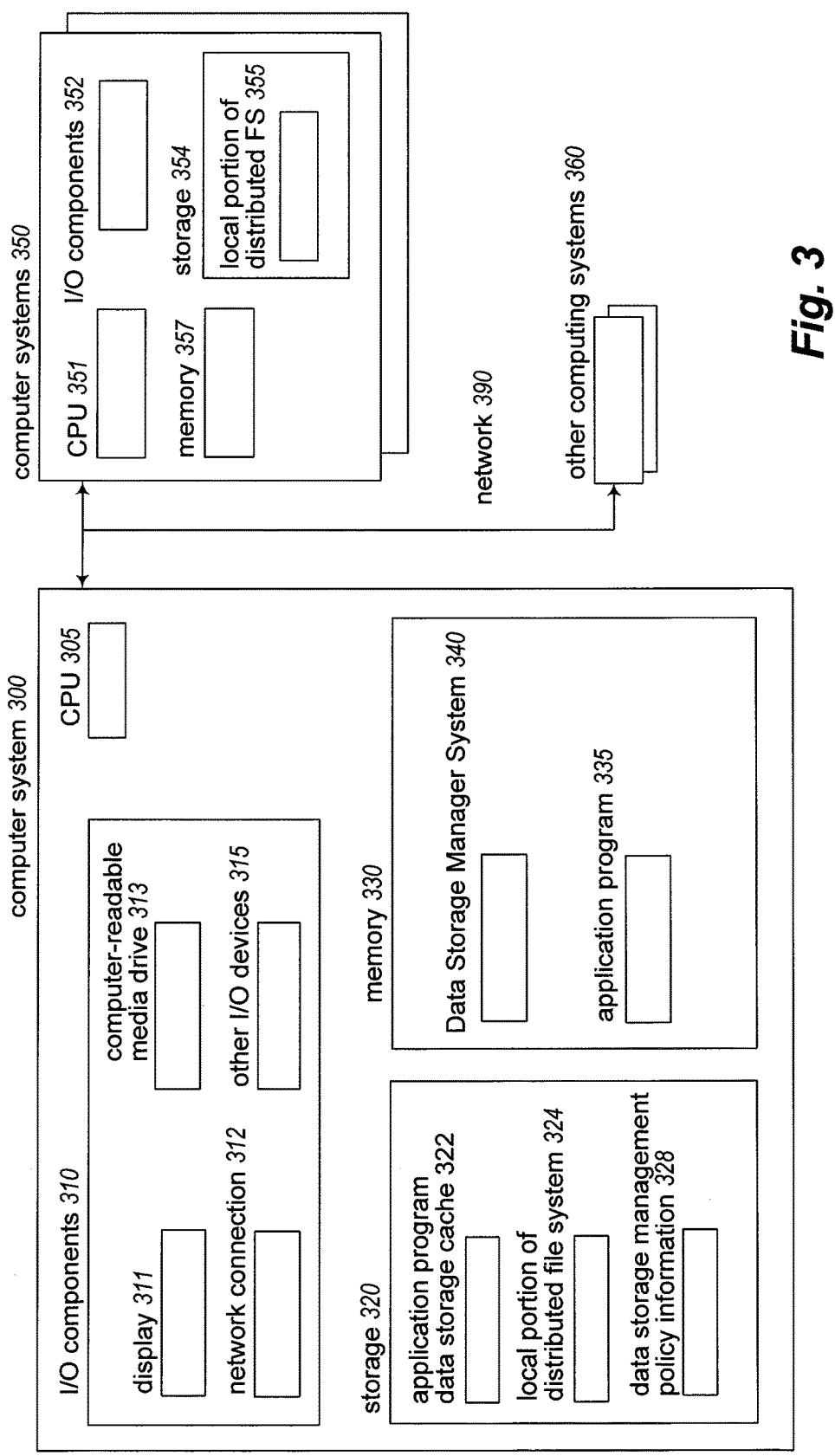
FIG. 3 is a block diagram illustrating an example embodiment of a computer system configured to manage data storage on supported storage mechanisms using a defined data storage management policy.

FIG. 3 is a block diagram illustrating an example embodiment of a computer system suitable for performing techniques to manage the storage and retrieval of data groups on supported storage mechanisms using a defined data storage management policy. In particular, FIG. 3 illustrates a computer system 300 suitable for executing an embodiment of a data storage manager system 340, as well as various computer systems 350 and other computing systems 360. For example, computer system 300 may in some embodiments serve as example target computing node 100a of FIGS. 1 and 2, computer systems 350 may in some embodiments serve as example computing nodes 100b of FIGS. 1 and 2, and the other computing systems 360 may include one or more of data source systems 160, online cache computing systems 180, online long-term storage systems 170 and other computing systems 175 of FIG. 1.

In the illustrated embodiment, the computer system 300 has components that include one or more hardware CPU processors 305, various I/O components 310, storage 320, and memory 330, with the illustrated I/O components including a display 311, a network connection 312, a computer-readable media drive 313, and other I/O devices 315 (e.g., a keyboard, a mouse, speakers, etc.). In other embodiments, the computer system 300 may have more or less components than are illustrated, and the storage 320 may optionally be provided by one or more non-volatile storage devices that are included within or otherwise locally attached to the computer system 300. In addition, the illustrated computer systems 350 have components similar to those of computer system 300, including a CPU 351, I/O components 352 (although particular components are not illustrated), storage 354, and memory 357. The other computing systems 360 may also each include similar components to some or all of the components illustrated with respect to computer system 300, but such components are not illustrated in this example for the sake of brevity.

An embodiment of a data storage manager system 340 is executing in memory 330 of computer system 300, such as to include software instructions that, when executed by the CPU 305, program or otherwise configure the computer system 300 to perform automated operations to provide some or all of the described techniques. In addition, an application program 335 is executing in memory 330, optionally in affiliation with (or integrated with) the system 340, although in other embodiments the system 340 may support one or more remote software programs over the network 390 (e.g., as executing on computing systems 360), or instead the system 340 may operate independently of any such software programs. In this example embodiment, the data storage manager system 340 includes functionality related to managing the storage and retrieval of a plurality of data groups (not shown) on behalf of the application program in accordance with a defined data storage management policy information 328 that is stored on storage 320, such as in response to instructions from one or more users (not shown) of the application program. The system 340 is further optionally configured to interact with computer systems 350 and/or computing systems 360 over the network 390 (e.g., via the Internet and/or the World Wide Web, via a private cellular network, etc.). The other computing systems 350 and 360 may also be executing various software as part of interactions with the system 340.

Various information related to the operation of the data storage manager system 340 and/or application program 335 may be stored in storage 320, such as one or more defined data storage management policies 328. In addition, in this example, a portion of the storage 320 is used to provide a data storage cache 322 for use by the data storage manager system 340 is storing data groups for use by the application program 335, and another portion of the storage 320 is used to provide a local portion of a distributed filesystem 324 for use by the data storage manager system 340 is storing data groups for use by the application program 335, such as in a manner analogous to the data storage cache 210a and portion 115a of the distributed file system of FIG. 2. In this example embodiment, other portions of the distributed filesystem ("FS") are locally provided using storage 354 of other computer systems 350. In other embodiments, one or both of the specified storage mechanisms 322 and 324 may not be provided and/or used, and other specified storage mechanisms may be provided and used (e.g., on the other computing systems 360). Additional details regarding operations of the system 340 in particular embodiments are described in greater detail elsewhere.

It will be appreciated that systems 300, 350 and 360 are merely illustrative and are not intended to limit the scope of embodiments of the present disclosure. For example, system 340 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a computer system or computing system or other device may comprise any combination of hardware that can interact and perform the described types of functionality, optionally when programmed or otherwise configured by particular corresponding software instructions, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated system 340 may in some embodiments be distributed in various modules.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computer systems via inter-computer communication. Thus, in some embodiments, some or all of the described techniques may be performed by hardware means that include one or more processors and/or memory and/or storage when configured by one or more software programs (e.g., by the system 340) and/or data structures (e.g., a defined policy 328), such as by execution of software instructions of the one or more software programs and/or by storage of such software instructions and/or data structures. Furthermore, in some embodiments, some or all of the systems and/or modules may be implemented or provided in other manners, such as by using means (e.g., specialized electronics) that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on non-transitory computer-readable storage media, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
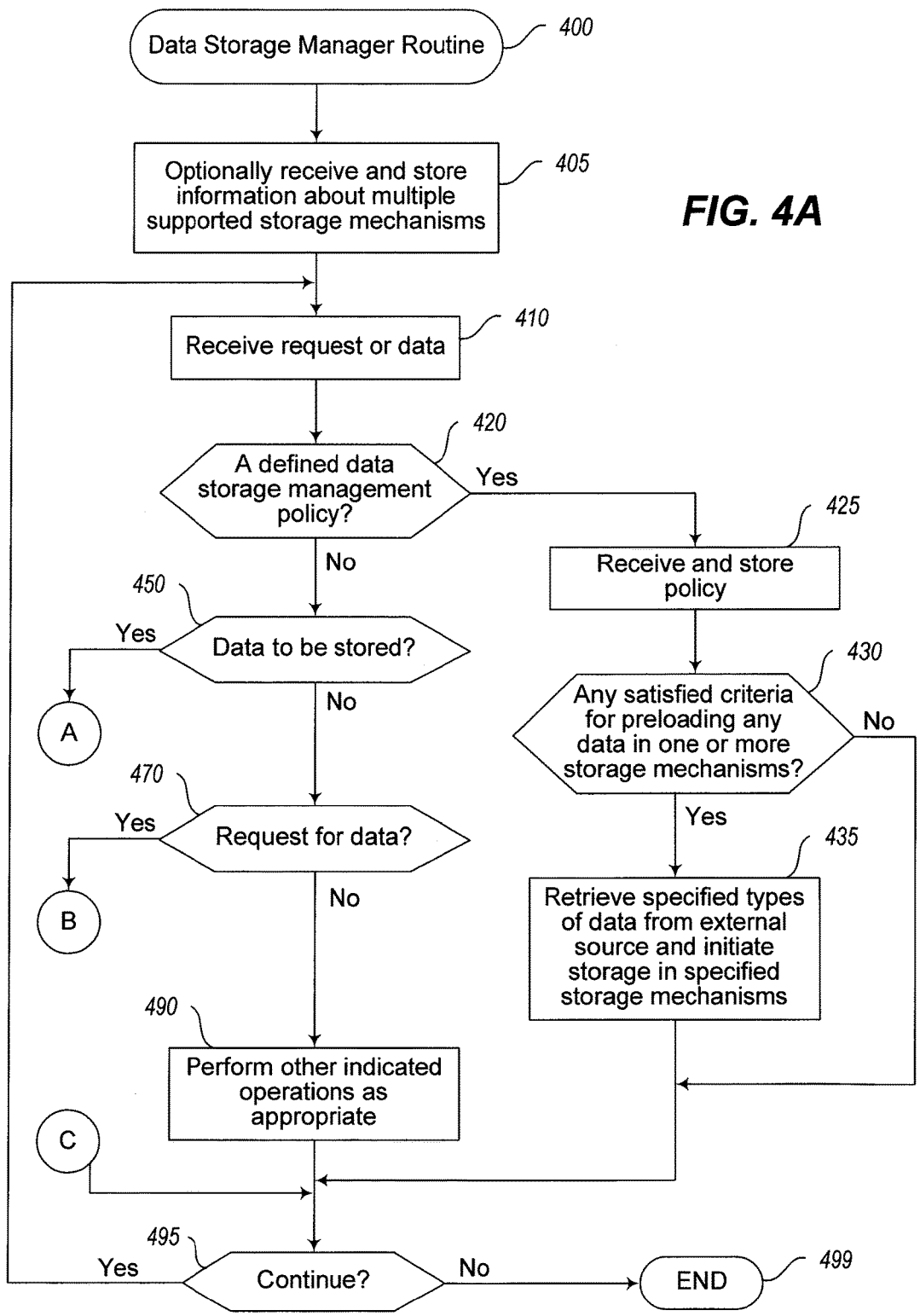
FIGS. 4A-4B illustrate an example embodiment of a flow diagram for a Data Storage Manager Routine.
Figure 4B:
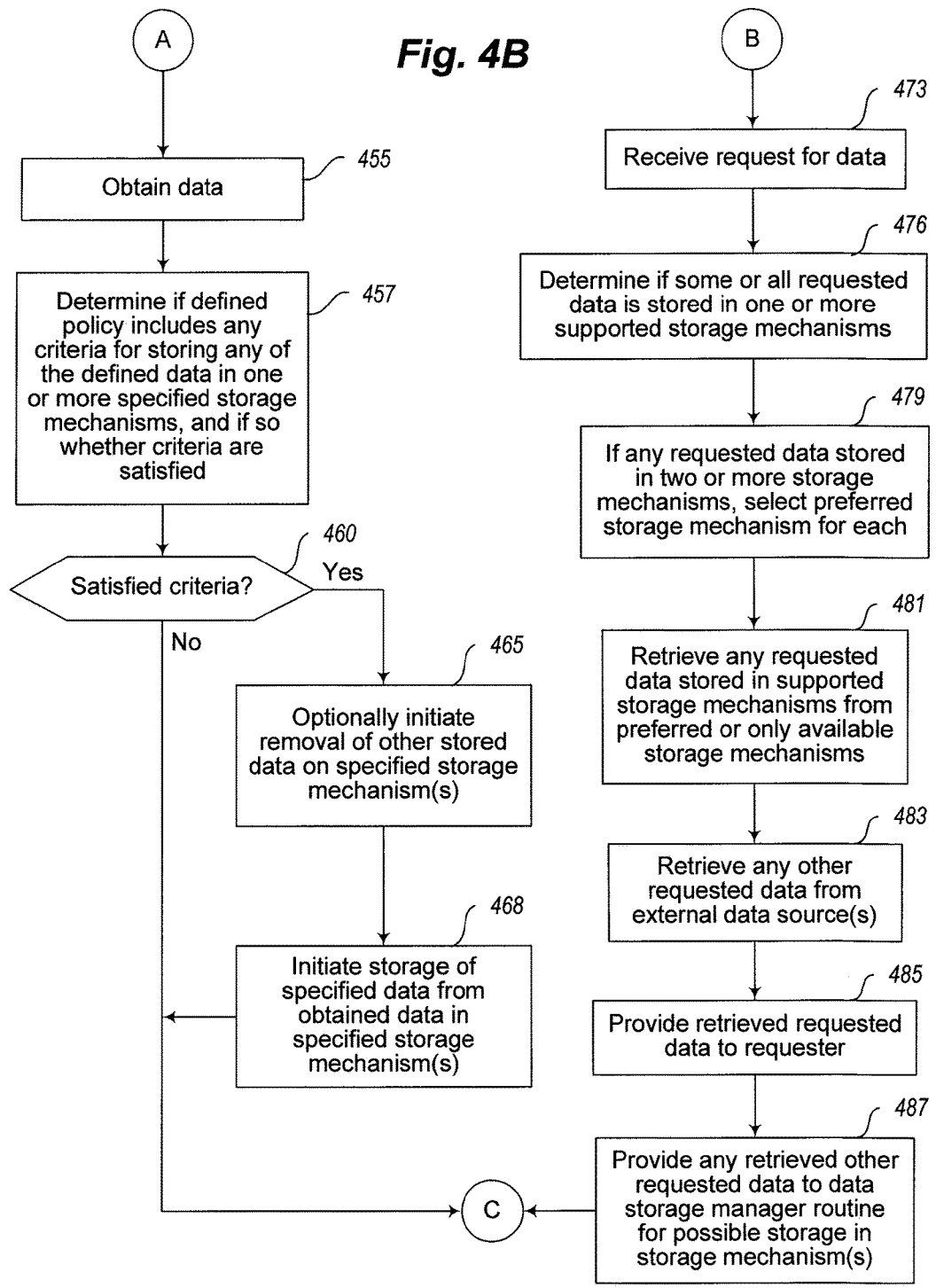

FIGS. 4A-4B are a flow diagram of an example embodiment of a Data Storage Manager routine 400. The routine may be provided, for example, by execution of the data storage manager system 150a of FIG. 1 and/or the data storage manager system 340 of FIG. 3, such as to manage the storage and retrieval of data groups in accordance with a defined data storage management policy, as well as to perform other types of actions in some situations. In this illustrated embodiment, the routine 400 manages various aspects of a data storage manager system, either alone or in conjunction with one or more remote online storage services provided by remote systems (such as systems 170 and 180 of FIG. 1), that performs certain aspects of the storage and retrieval of data groups to support a particular application program, although the described techniques may be used in other manners in other embodiments, including to simultaneously support multiple different software programs using different defined policies and/or to support data storage and retrieval in accordance with a defined policy that is not specific to any particular software programs.

In the illustrated embodiment, the routine begins at block 405 of FIG. 4A, where the routine optionally receives and stores information about one or more supported storage mechanisms, such as to configure later operations of the routine—such information may, for example, identify locations of particular storage mechanisms, data storage and/or retrieval characteristics for particular storage mechanisms, access information specific to the data storage manager system and/or to the application program for use with one or more such storage mechanisms, etc. The routine may further in some embodiments receive and store information about the particular application program being supported. In other embodiments, information about particular specified storage mechanisms to use are instead provided as part of a defined data storage management policy, optionally including access information specific to the application program for use with one or more such storage mechanisms.

After block 405, the routine continues to block 410 to wait until a request or data is received (e.g., from the application program, from a remote data storage service, etc.). The routine continues to block 420 to determine if an indication of a defined data storage management policy is received, such as to correspond to the initialization of the application program or another event. If so, the routine continues to block 425 to receive the policy (e.g., by receiving it in block 410, by retrieving it in block 425, etc.) and to store it for later use. After block 425, the routine continues to block 430 to analyze the defined policy and determine whether it specifies any data groups to be preloaded. In addition, if any such preloading instructions are included, the routine further determines whether the defined policy includes any corresponding criteria to control how, whether and/or when to perform the preloading of those data groups, and if so whether those criteria are currently satisfied. If is determined in block 430 that such preloading instructions exist and that associated criteria (if any) are currently satisfied, the routine continues to block 435 to initiate the retrieval of corresponding data groups and to initiate the storage of the retrieved data groups in corresponding specified storage mechanisms. It will be appreciated that in some situations, a particular data group may be stored in multiple specified storage mechanisms. In some embodiments, the operations of block 435 may be performed in a synchronous manner, such that requests are made to one or more external data sources for data groups of interest (e.g., particular data groups, such as identified by name or other unique characteristic; data groups of a particular type; data groups that match specified search criteria; etc.), the corresponding data groups are received by the routine, and the routine then performs storage operations to store those retrieved data groups on specified storage mechanisms. In other embodiments, requests may be made to retrieve data groups from one or more external data sources, and when the data groups are later received, the data groups are stored in a manner discussed with respect to blocks 450-468. In yet other embodiments, requests may be made to one or more external data sources, which are directed to send data groups of interest to one or more specified storage mechanisms in particular manners, without the routine 400 being further involved in the storage of the data on those storage mechanisms.

If it is instead determined in block 420 that the received indication in block 410 is not a defined policy, the routine continues instead to block 450 to determine if one or more data groups are indicated to be stored. Such data groups may be received, for example, from an external data source (e.g., as discussed with respect to blocks 435 and 483), from an application program (e.g., if the application program retrieves or otherwise obtains the data, and then provides it to the routine 400 for storage), etc. If it is determined in block 450 that one or more data groups are received to be stored, the routine continues to block 455 to obtain the data groups, such as by receiving the data groups in block 410, or otherwise retrieving those data groups. The routine then continues to block 457 to retrieve and analyze a previously defined data storage management policy, and determine whether any of the obtained data groups are specified to be stored on one or more specified storage mechanisms. In addition, if instructions are included corresponding to any of the obtained data groups, the routine further determines whether the defined policy includes any corresponding criteria to control how, whether and/or when to perform the preloading of those data groups, and if so whether those criteria are currently satisfied. If is determined in block 460 that such instructions exist for one or more obtained data groups and that associated criteria (if any) are currently satisfied, the routine continues to block 465 to optionally initiate removal of other stored data from the specified storage mechanism(s), such as to make space for the data groups to be stored if the storage space on the specified storage mechanism(s) is full, or as otherwise specified in data retention or replacement policies for the specified storage mechanisms (e.g., if a TTL value for a stored data group has expired). In some embodiments, the removal of stored data from the specified storage mechanism(s) is performed in accordance with the defined data storage management policy being used, while in other embodiments the removal may be controlled in other manners (e.g., based on data retention policies specified by or managed by particular specified storage mechanisms). After block 465, or if stored data removal operations are not performed, the routine continues to block 468 to initiate the storage of the one or more obtained data groups in corresponding specified storage mechanisms, such as in a manner similar to that previously discussed with respect to block 435. It will be appreciated that in some situations, one or more obtained data groups may be stored in one or more specified storage mechanisms, and one or more other obtained data groups may not be stored in any specified storage mechanisms—in addition, in some situations, a particular data group may be stored in multiple specified storage mechanisms.

If it is instead determined in block 450 that the received indication in block 410 is not an indication of one or more data groups to be stored, the routine continues instead to block 470 to determine if the received indication in block 410 is an indication of a request for data, such as a request from the application program. As previously noted, in some embodiments and situations, the request may be explicitly made by the application program to the data storage manager system, such as to determine if the requested data is available in any specified storage mechanisms, while in other embodiments the request may be made by the application program to an external data source and intercepted by the data manager storage system. If it is determined in block 470 that the received indication in block 410 is an indication of a request for data, the routine continues to block 473 to obtain the request, such as by receiving the request in block 410, or by otherwise retrieving the request. The routine then continues to block 476 to determine if some or all of the requested data is stored in one or more supported storage mechanisms, such as based on an index or other information tracked and stored by the data storage manager system, based on the data storage manager system interacting with supported storage mechanisms to determine the data groups currently stored by those storage mechanisms, etc. If any of the requested data groups are stored in multiple supported storage mechanisms, the routine in block 479 selects a preferred storage mechanism for each such data group, such as based on a specified ordering of the supported storage mechanisms, or as is otherwise specified in the defined policy being used.

After block 479, the routine continues to block 481 to retrieve any of the requested data groups that are stored in the supported storage mechanisms, using the preferred storage mechanism for any data groups stored in multiple storage mechanisms. The routine then retrieves any other requested data groups from one or more external data sources, such as by forwarding some or all of the received request to the external data sources, and optionally in a manner similar to that previously described with respect to block 435. In the illustrated embodiment, if any data groups are retrieved from external data sources, the routine waits until the requested data is received, and then continues to block 485 to provide the requested data to the application program or other requester, such as by combining any data groups obtained in block 481 with any other data groups obtained in block 483. In other embodiments, the routine may instead make requests in blocks 481 and/or 483 and then continue, any later handle any corresponding data groups that are received in block 490 or in blocks 450-468. After block 485, the routine continues to block 487 to initiate the possible storage of any data groups received from external data sources in block 483 in one or more storage mechanisms for later use, such as by sending those data groups to the routine for subsequent handling in blocks 450-468, or by otherwise performing such functionality.

If it is instead determined in block 470 that the received indication in block 410 is not an indication of a request for data, the routine continues instead to block 490 to perform one or more other indicated operations as appropriate. Such other operations may include, for example, receiving and storing other configuration information for use by the routine, receiving data groups that were previously requested from external data sources and/or supported storage mechanisms and handling those received data groups in manners previously discussed, performing periodic operations to remove data groups stored in one or more supported storage mechanisms in accordance with the defined data policy, etc.

After blocks 435, 468, 487 or 490, or if it is otherwise determined in block 430 that there are no data groups to preload or in block 460 that there are no data groups to store in supported storage mechanisms, the routine continues to block 495 to determine whether to continue, such as until an explicit indication to terminate is received (e.g., from an operator of the data storage manager system, from the application program, etc.). If it is determined to continue, the routine returns to block 410, and if not continues to block 499 and ends.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:

receiving, by a configured computer system, a defined data storage management policy for use with an indicated program during execution on the configured computer system, wherein the defined data storage management policy specifies first criteria for storing a first group of data on a remote online storage service that is separated from the configured computer system by one or more computer networks, specifies second criteria for storing a second group of data on a distributed online memory cache stored using volatile memory of multiple computer systems, and specifies third criteria for storing a third group of data on a distributed file system stored on multiple non-volatile storage devices accessible to the configured computer system via a computer network to which the configured computer system is attached;

initiating, by the configured computer system, and prior to receiving any data access request for use by the indicated program of the first group of data, of the second group of data, or of the third group of data, the execution of the indicated program, including preloading data for subsequent use by the indicated program by:
determining, by the configured computer system, that the specified first criteria are satisfied, and initiating storing the first group of data on the online storage service;
determining, by the configured computer system, that the specified second criteria are satisfied, and initiating storing the second group of data on the distributed online memory cache; and
determining, by the configured computer system, that the specified third criteria are satisfied, and initiating storing the third group of data on the distributed file system; and
retrieving and using, during the execution of the indicated program and in response to one or more data access requests for use of at least some of the preloaded data by the indicated program, the at least some preloaded data.

2. The method of claim 1 wherein the retrieving of the at least some preloaded data in response to the one or more access requests includes retrieving, by the configured computer system, the stored first group of data from the online storage service and storing the retrieved first group of data on storage local to the configured computer system for use by the executing indicated program.

3. The method of claim 2 wherein the retrieving of the stored first group of data is based at least in part on one or more requests from one or more users of the executing indicated program, and wherein the defined data storage management policy is used to enable access by the one or more users to the first group of data.

4. The method of claim 2 wherein the determining that the first, second and third specified criteria are satisfied is performed by a data storage manager system executing on the configured computer system that is distinct from the executing indicated program.

5. The method of claim 2 wherein the first group of data is specified in the defined data storage management policy by specifying a type of data to which the first group of data belongs, and wherein the indicated program uses, during the initiated execution, data of multiple types that include the first type and one or more other types.

6. The method of claim 2 wherein the indicated program uses, during the initiated execution, multiple groups of data that include the first, second and third groups of data and further include one or more additional groups of data that are not specified in the defined data storage management policy.

7. The method of claim 1 wherein the first group of data is specified in the defined data storage management policy by specifying one or more metadata tags, and wherein the method further comprises determining, by the configured computing system, that the first group of data has at least one of the one or more metadata tags.

8. The method of claim 1 further comprising selecting, by the configured computing system and based on the defined data storage management policy, storage mechanisms for use with indicated groups of data from multiple available storage mechanisms that include the online storage service and the distributed online memory cache and the distributed file system and that further include a non-volatile storage device local to the configured computer system.

9. The method of claim 8 wherein the non-volatile storage device local to the computer system is used at least in part as a storage cache for one or more other of the multiple available storage mechanisms.

10. The method of claim 9 wherein the retrieving of the at least some preloaded data in response to the one or more data access requests includes providing, by the configured computer system to the indicated program, at least some of the first group of data from the online storage service, at least some of the second group of data from the distributed online memory cache, and at least some of the third group of data from the distributed file system.

11. The method of claim 1 wherein the configured computer system is part of a group of multiple computer systems that operate together in a distributed manner to each locally store a specified subset of multiple groups of data.

12. A non-transitory computer-readable medium having stored contents that cause a computer system to:
receive, by the computer system, a defined data storage management policy for use in preloading data to later be used by an indicated program during execution on the computer system, wherein the defined data storage management policy specifies first criteria for selecting a first storage mechanism of multiple accessible storage mechanisms on which to preload a first group of data of a first type and specifies second criteria for selecting a second storage mechanism of the multiple accessible storage mechanisms on which to preload a second group of data of a second type;
store, by the computer system at a time of initiating the execution of the indicated program:
the first group of data on the first storage mechanism in accordance with the first specified criteria and to preload the stored first group of data for later use by the indicated program during the execution, wherein the first storage mechanism is selected based on the first specified criteria to be a distributed online memory cache using volatile memory of multiple computer systems; and
the second group of data on the second storage mechanism in accordance with the second specified criteria and to preload the stored second group of data for later use by the indicated program during the execution, wherein the second storage mechanism is selected based on the second specified criteria to be a distributed file system stored on multiple storage devices accessible to the computer system via a computer network; and
retrieve and use, during the execution of the indicated program on the computer system, the stored first and second groups of data, including to provide the retrieved first and second groups of data to the indicated program for use.

13. The non-transitory computer-readable medium of claim 12 wherein the multiple accessible storage mechanisms further include a non-volatile storage device local to the computer system, and wherein the stored contents include software instructions that, when executed, further cause the computer system to store, in accordance with the third criteria specified in the defined data storage management policy and as part of initiating the execution of the indicated program on the computer system, a third group of data of a third type on the non-volatile storage device to preload the stored third group of data for later use by the indicated program, and to retrieve, at a later time while the indicated program is executing, the stored third group of data for use by the executing indicated program.

14. The non-transitory computer-readable medium of claim 13 wherein the stored contents further cause the computer system to identify, before the preloading of the first and second groups of data, the first and second groups of data as being of different first and second types based on differences in type of data in the first and second groups of data or in locations of the first and second groups of data, and to perform the storing of the first and second groups of data as part of the initiating of the execution of the indicated program.

15. A computer system, comprising:
one or more processors; and
one or more memories with software instructions that, when executed by at least one of the one or more processors, cause the at least one processor to manage data storage for the computer system, the managing of the data storage including:
receiving a defined data storage management policy for use in preloading data to later be used by an indicated program, wherein the defined data storage management policy specifies a first group of data of a first type to be preloaded on a first storage mechanism of multiple storage mechanisms accessible to the computer system, and specifies a second group of data of a second type to be preloaded on a second storage mechanism of the multiple storage mechanisms;
initiating execution of the indicated program and using the defined data storage management policy, including:
storing, before any request for the first group of data for the indicated program, the first group of data on the first storage mechanism to preload the stored first group of data for later use by the indicated program during the execution, wherein the first storage mechanism is selected to be a distributed file system stored on multiple storage devices accessible to the computer system via a computer network; and
storing, before any request for the second group of data for the indicated program, the second group of data on the second storage mechanism to preload the stored second group of data for later use by the indicated program during the execution, wherein the second storage mechanism is selected to be an online memory cache distributed across volatile memory of multiple computer systems; and
retrieving, for the indicated program and during the execution, at least one of the stored first and second groups of data for use by the indicated program.

16. The computer system of claim 15 wherein the defined data storage management policy further specifies first criteria for storing data of the first type and second criteria for storing data of the second type, wherein storing of the first group of data is further performed based at least in part on the first criteria being determined to be satisfied, and wherein storing of the second group of data is further performed based at least in part on the second criteria being determined to be satisfied.

17. The computer system of claim 15 further comprising a non-volatile storage device local to the computer system and a network connection operable to access an online storage service remote from the computing system over one or more networks, and wherein the software instructions, when executed, further cause the at least one processor to:
preload, before the indicated program begins executing, a third group of data of a third type on the non-volatile storage device in accordance with the defined data storage management policy;
preload, before the indicated program begins executing, a fourth group of data of a fourth type on the online storage service; and
retrieve, during the execution of the indicated program, the stored third and fourth groups of data for use by the indicated program.

18. The computer system of claim 17 wherein the software instructions, when executed, further cause the at least one processor to identify the first and second groups of data as being of different first and second types based on differences in a type of data in the first and second groups of data and in locations of the first and second groups of data before preloading, and to perform the storing of the first and second groups of data as part of the initiating of the execution and before the indicated program begins executing and before the indicated program makes any requests for data.

* * * * *